United States Patent [19]
Ash

[11] 3,764,641
[45] Oct. 9, 1973

[54] METHOD OF FORMING IRREGULARLY SHAPED HOLLOW ARTICLES USING A VARIABLE STIFFNESS MANDREL

[76] Inventor: Alvin G. Ash, P.O. Box 5893, Gig Harbor, Wash.

[22] Filed: Jan. 8, 1971

[21] Appl. No.: 105,120

Related U.S. Application Data

[63] Continuation of Ser. No. 762,857, Sept. 26, 1968, abandoned.

[52] U.S. Cl. .................. 264/45, 5/348 R, 156/245, 161/53, 161/160, 249/65, 264/3, 264/221, 264/225, 264/257, 264/314
[51] Int. Cl. .......................................... B29d 27/04
[58] Field of Search ..................... 264/314, 321, 3, 264/257, 221, 225, 314; 156/79, 245; 5/348 R; 161/53, 160; 249/65

[56] References Cited
UNITED STATES PATENTS

| | | | |
|---|---|---|---|
| 3,629,030 | 12/1971 | Ash | 249/65 X |
| 3,675,377 | 7/1972 | Suter | 161/160 X |
| 3,052,019 | 9/1962 | Strasser | 264/221 X |
| 3,135,640 | 6/1964 | Kepka et al | 264/314 X |
| 3,177,105 | 4/1965 | Wiltshire | 264/314 X |
| 3,316,337 | 4/1967 | North | 264/314 |
| 3,307,318 | 3/1967 | Bauman | 264/321 UX |
| 3,205,106 | 9/1965 | Cross | 156/79 |

OTHER PUBLICATIONS

Bender, Rene J. "Handbook of Foamed Plastics". Libertyville, Ill., Lake Publishing, 1965, pp. 52–54, 125, 151–153, 221–224, 285, 287–289.

Primary Examiner—Philip E. Anderson
Attorney—Seed, Berry & Dowrey

[57] ABSTRACT

A structure of flexible foam material covered by an elastomeric casing which is subjected to increased internal air pressure to make the structure rigid. Creating a vacuum within the structure causes it to collapse. The structure is used as a mandrel in a process for fabricating plastic conduits. The structure includes flexible tubes embedded in the foam material inflated to improve structural strength.

5 Claims, 6 Drawing Figures

PATENTED OCT 9 1973　　　　　　　　　3,764,641

ALVIN G. ASH
INVENTOR.

BY

ATTORNEYS

METHOD OF FORMING IRREGULARLY SHAPED HOLLOW ARTICLES USING A VARIABLE STIFFNESS MANDREL

This application is a continuation of earlier application Ser. No. 762,857, filed Sept. 26, 1968 and now abandoned.

BACKGROUND OF THE INVENTION

The present invention relates to methods and apparatus for fabricating hollow articles. Specifically, the present invention relates to a structure whose rigidness or stiffness can be varied which is capable of serving as a reusable mandrel in processes for forming plastic conduits.

Plastic conduits, as well as other hollow articles, are commonly fabricated about plaster-of-paris mandrels. These mandrels are not reusable because they are destroyed to separate them from the fabricated product. Inflatable mandrels are employed in fabricating processes but are generally limited to simple configurations. These mandrels are inflated for fabricating an article and deflated for separating the article. Although reusable, prior art inflatable mandrels have been limited generally to circular cross-sectional configurations. The circular configuration is prevalent because pressure exerted by a fluid is equal in all directions thereby giving rise to the circular configuration.

Accordingly, it is an object of the present invention to improve methods of forming hollow articles. Also it is an object to devise a reusable mandrel for the process of forming hollow articles. It is an object to build a structure which is sufficiently rigid to permit an article to be formed about it but which is collapsible to permit separation of the structure from the fabricated article. Yet another object is to build a structure having the foregoing stiffness and collapsible characteristics by bonding a casing to a flexible, open cell foam material. The rigidness of the structure is increased by increasing the internal air pressure. The inflated structure is sufficiently rigid to allow the formation of a plastic article about it. When the pressure inside the structure is reduced below atmospheric, the structure collapses thereby separating it from the fabricated article. The structure is sufficiently flexible or resilient when at atmospheric pressure to enable it to be removed from the manufactured article.

The casing makes the foam material air tight enabling the fluid pressure within the foam to be varied. The foam material substantially maintains its shape, which may be any geometric configuration, when subjected to increased internal pressure, i.e. inflated. Accordingly, it is an object of the present invention to devise an inflatable mandrel having cross-sectional shapes other than that of a circle.

In addition, it is an object of the present invention to build a structure or apparatus which is capable of having its flexibility varied continuously over a wide range. It is also an object to improve the structural strength of a variable rigid structure by bonding reinforcing tubes within a foam material of the structure. Another object is to improve the ability of a foam material to maintain its shape while subjected to internal pressures by typing opposite walls of the foam material together with thread.

DESCRIPTION OF THE DRAWINGS

Other objects and features of the present invention will be apparent from a further reading of the description of the invention and in light of the accompanying drawings which are.

DESCRIPTION OF THE INVENTION

Figure 1:
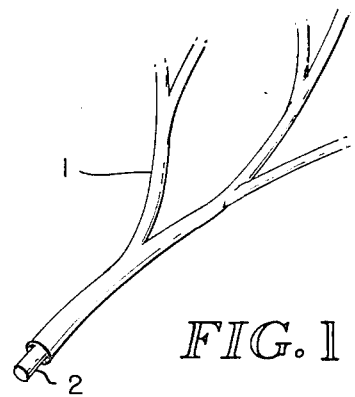
FIG. 1 is a perspective view of a hollow article fabricated about a variable stiffness structure or mandrel of the present invention.

Plastic conduit 1 is fabricated about mandrel 2 according to the present invention (FIG. 1). Conduit 1 is illustrative of the geometric complexity which can be obtained by the present method and apparatus. The mandrel 2 is reusable being generally of an inflatable type. In the present invention, however, the mandrel assumes a desired shape without being expanded under the pressure exerted by a fluid. While in a non-inflated state the mandrel is sufficiently flexible, as characteristic of the foam materials from which it is constructed, to be readily removed from the cavity of conduit 1 by merely pulling on it. Inflating mandrel 2, i.e., increasing the internal pressure, increases the rigidity of the mandrel without substantially altering the size or shape of the mandrel. The conduit is fabricated about the mandrel while in a rigid state. Reducing the internal pressure of the mandrel below atmospheric alters its size and shape thereby separating the mandrel 2 from the conduit 1. While subjected to the vacuum or at atmospheric pressure, the separated mandrel is readily removed from the conduit.

Figure 2:
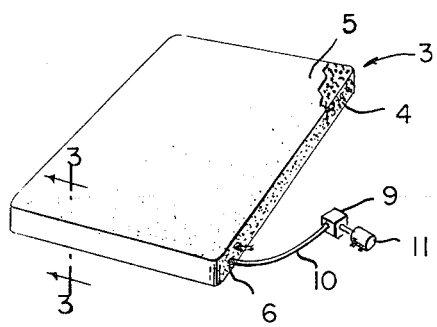
FIG. 2 is a perspective view of a structure according to the present invention with a motor, pump, and hose connected thereto for increasing and decreasing the air pressure within the structure.

Structure 3 in FIG. 2 is a mandrel constructed according to the present invention having generally rectangular, planar shaped surfaces. The planar surface dramatically illustrates the improvement of the present apparatus over prior art inflatable type mandrels because a plane is the furthest removed geometric shape from the circle. Much more complicated structures than that of a rectangular soiid can be fabricated.

Structure 3 is comprised of foam material 4, casing 5, and orifice 6. The foam material is an open-cell, flexible substantially non-elastic substance such as polyurethane or polyethylene. The foam is shaped in a specific configuration by sculpturing a block of foam material or by initially fabricating the foam material in the desired shape by curing the liquid foam material in a female mold of the specific configuration.

The casing 5 is a flexible substance sufficiently non-porous to retain a fluid under pressure within the open-cells of the foam material. The casing must be bonded to the surfaces of the foam so that it conforms to the shape of the foam. If the casing is not sufficiently adhered to the foam it will balloon or bulge in a generally spherical or circular manner.

Foam materials such as polyurethene have cells or compartments distributed generally uniformly throughout their volume. These cells are referred to as being "open" because they are randomly interconnected to one another. A fluid, introduced at orifice 6 disperses generally equally throughout the volume of the foam material. An air-tight casing 5 (when fluid is air) permits the air pressure to be built up generally uniformly throughout the foam by restraining air pumped into the structure 3 through orifice 6. Orifice 6 is of the type commonly employed on pneumatic tires of automobiles. The orifice is connected to the casing to enable a fluid, specifically air, to be pumped into and out of the foam material. (Air refers to the gases commonly found in the earth's atmosphere).

The normally highly flexible foam structure is rendered rigid because of stress or tension acting on the casing due to fluid pressure. The casing 5 prevents the free escape of the air and enables the rigidity or flexibility of the encased foam structure to vary continuously as the pressure of air within the structure is increased. The size and shape of the encased foam structure remains substantially unaltered as the air pressure is increased and remains unaltered as long as the tensile strength of the foam material 4 is not exceeded. Air pressures typically of 2 – 4 pounds per square inch gage (psig) have been created within a rubber encased, polyurethane foam structure. Considerably higher pressures have bpen used without exceeding the tensile strength of the foam.

The plastic conduit 1 is fabricated about mandrel 2 as follows: A femal mold (not shown) is constructed from suitable materials shaped to correspond to a specific shape for mandrel 2. While in a liquid state, the foam material 4 is poured into the female mold and solidified or cured by well known techniques. The molded foam material 4 is removed from the female mold and a solution of liquid synthetic rubber or other elastomeric material is applied to form the casing 5. Orifice 6 is embedded in the rubber casing before it is hardened. (i.e. cured) to obtain an air tight connection of the valve to the casing.

Figure 3:
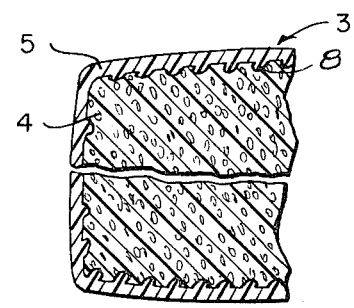
FIG. 3 is an enlarged cross-sectional elevational view taken along lines 3—3 in FIG. 2.

While in a liquid form, the rubber flows or penetrates to a depth 8 (FIG. 3) within the foam material. When the rubber is hardened or cured by well-known curing techniques the foam material is embedded in it creating an excellent bond between the foam material 4 and casing 5. A sufficient thickness of rubber is used to insure that the generally non-porous rubber creates an airtight casing. The rubber-encased foam material forms the mandrel 2.

Next, mandrel 2 is coated with a suitable parting agent to minimize and substantially prevent adhesion between the mandrel 2 and the fabricated conduit 1. The pump 9 is coupled to mandrel 2 by hose 10 in generally the same manner as they are coupled to structure 3 in FIG. 2. A suitable motor 11 powers pump 9. Air is pumped into the mandrel to render it sufficiently rigid for fabricating the conduit.

Next, sheets of uncured plastic resin and fiber glass are wrapped or otherwise molded and shaped about the contours of mandrel 2 and cured according to well-known methods to harden the plastic material. The pump 9 is again coupled to orifice 6 to create a vacuum in the foam material. (Vacuum refers to pressures below atmospheric pressures). The pressure differential between the outside and inside of the foam mandrel 2 causes it to collapse and otherwise alter its shape separating it from the fabricated conduit 1. The collapsed mandrel is pulled from the cavity of the conduit. Finally, the mandrel is reinflated to the pressure for a desired rigidity and a subsequent product is fabricated about it.

The mandrels of the present invention may be employed in various fabrication processes. An example of another process is where a mandrel is inserted into the cavity of a female mold and the material comprising the article to be manufactured is packed about the mandrel between it and the female mold. The mandrel can be used to shape the cavity in a sand mold used in foundries to cast metal articles. Also, the mandrel can be used to create a cavity in a product such as solid rocket fuel.

Figure 4:
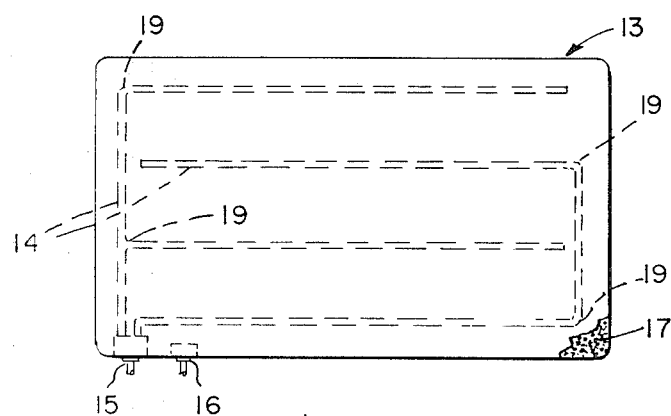
FIG. 4 is a plan top view of a structure like that of FIG. 2 showing air valves coupled to the structure and including hollow tubes embedded in the structure.

Mandrel 13 in FIG. 4 is substantially the same as structure 3 in FIG. 2 further including the tubes 14 embedded therein. The tubes are flexible members which when inflated become rigid. The inflated tubes increase the structural strength of the mandrels without substantially altering their shape or function. Mandrel 13 has orifice 15 coupled to tubes 14 for inflating and deflating the tubes and orifice 16 for inflating and deflating the encased foam material 17.

The tubes 14 must be tightly bonded to the foam material 17 of mandrel 13. The bond is necessary to preserve the shape of the mandrel when pressurized. If the bond is not tight, air pumped into mandrel 13 via orifice 16 creates a pocket between the foam material and tubes causing the mandrel to balloon outward as would any hollow flexible structure filled with air. The pressure in the tubes can be in the range of 40–80 psig to greatly increase the structural strength of the mandrel while the pressure in the foam is in the range of 2–4 psig to make it rigid. The tubes are normally deflated when a vacuum is created in the foam 17 to collapse the foam and separate it from the article formed about it.

The tubes 14 include elbows 19 to enable the tubes to be aligned along more than one axis of the mandrel further increasing the structural strength of the mandrel. The tubes 14 serve generally the same function as reinforcing steel rods embedded in concrete. The tubes, however, can be made flexible by deflation to take full advantage of the flexible character of the foam material 17.

Figure 5:
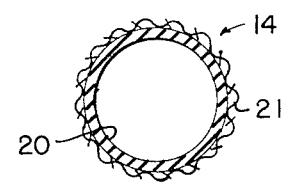
FIG. 5 is an enlarged cross-sectional view of a tube embedded in the structure of FIG. 4.

FIG. 5 illustrates the cross-section of a preferred embodiment of tube 14. The tube includes a rubber inner tube 20 and a non-elastic reinforcing material 21. Overinflation of the tube 14 is prevented by the reinforcing material 21. The tension created radially and axially in the material 21 when tube 14 is inflated offers an extremely rigid structure member.

Figure 6:
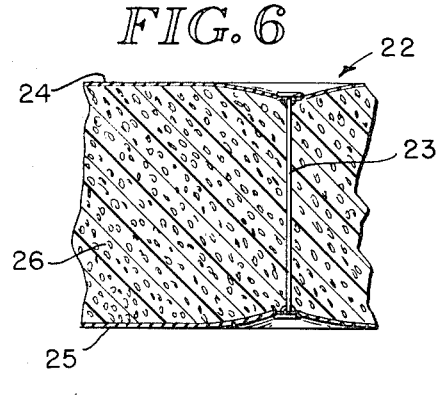
FIG. 6 is a sectional view of a structure according to the present invention showing the use of tufting thread.

The mandrel 22 of FIG. 6 is substantially the mandrel or structure 3 in FIG. 2 further including tufting thread 23. Thread 23 is tied or sewed between walls 24 and 25 of mandrel 22 to absorb a portion of the tension created within the foam material 26 when the internal air pressure is increased. Tufting improves the present invention by allowing greater pressures to be created within them without exceeding the tensile strength of the foam. The benefit is that a structure can be made more rigid.

The structures of the present invention find application in any field requiring a variable stiffness structue. By way of example, the structure 3 in FIG. 2 can serve as a mattress for a hotel bed. The stiffness or firmness of the mattress can be varied over a continuous range to suit the precise tastes of different lodgers.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege is claimed are defined as follows:

1. A method of forming irregularly shaped hollow articles having at least one open end without requiring the use of a female mold about the exterior of the article during formation which includes:
    forming a mandrel core of flexible open cell, foam material having an exterior shape substantially duplicating the desired interior shape of the hollow article to be formed which foam material will become rigid and will maintain a fixed size and shape substantially identical with the exterior size and shape of the foam material as formed when subjected to any level of internal fluid pressure which is in excess of the exterior pressure level but which is below an upper pressure level at which the core will begin to expand, said upper pressure level being measurably greater than the exterior pressure level and which foam material will collapse when subjected to a fluid pressure level below the pressure level on the exterior of the core,
    bonding a layer of elastomeric fluid impermeable material to the entire outer surface of said core to form a gas tight flexible mandrel,
    connecting a fluid pressure valve means with said mandrel in communication with said mandrel core through said layer of elastomeric fluid impermeable material,
    injecting a fluid into the foam material to create a fluid pressure therein sufficient to substantially increase the rigidity of the mandrel without reaching said upper pressure,
    forming said article about said mandrel by applying material capable of being rigidified to the exterior of the mandrel while the mandrel is pressurized, and
    causing said article to become rigid, decreasing said fluid pressure so as to collapse the mandrel, and removing the mandrel from the article.

2. The method according to claim 1 wherein the steps of forming the mandrel include;
    forming said foam material of said mandrel core in a female mold defining said shaped outer surface, and then coating the surface of the foam material with a curable liquid material and curing said liquid material to bond and embed the same in the surface of said foam material to form said elastomeric, fluid impermeable shaped outer surface layer.

3. The method according to claim 6 wherein the step of forming the article about the pressurized mandrel includes the steps of;
    wrapping uncured plastic about the mandrel and then curing the plastic; imparting to the interior of the plastic a shape corresponding to said shaped outer surface.

4. The method of claim 1 wherein said fluid pressure valve means constitutes a first fluid pressure means, wherein the steps of forming said mandrel include
    locating at least one inflatable chamber means of limited expanded cross section and having a second fluid pressure valve means communicating with the interior of the chamber in a female mold defining said shaped outer surface of said mandrel,
    forming said foam material in said mold about said inflatable chamber means while the chamber means is inflated to said expanded cross-section so as to form a tight bond between the walls of the chamber means and the foam, and
    wherein the step of forming the article includes maintaining an equal or greater fluid pressure in said inflatable chamber than said foam material during fabrication of said article to reinforce said foam, the pressure in said chamber means being released to enable removal of the mandrel from the finished article.

5. A method of forming irregularly shaped hollow articles including the steps of providing a flexible mandrel having a fluid permeable core, pressurizing the mandrel by injecting fluid under pressure into the mandrel to cause the mandrel to hold a desired size and shape, applying hardenable article forming material about the mandrel, causing the article forming material to harden and withdrawing fluid from the mandrel to collapse the mandrel so that the mandrel can be removed from the article wherein the improvement comprises the steps of
    forming a core of flexible open-cell collapsible foam material having an exterior shape substantially duplicating the desired interior shape of the hollow article to be formed which foam material will become rigid and will maintain a fixed size and shape substantially identical with the exterior size and shape of the foam material as formed when subjected to any level of internal fluid pressure which is in excess of the exterior pressure level but which is below an upper pressure level at which the core will begin to expand, said upper pressure level being measurably greater than the exterior pressure level and which material will collapse when subjected to an internal fluid pressure level below the external pressure level; and
    bonding a layer of flexible, fluid impermeable material to the entire outer surface of said core to form a gas tight flexible mandrel, whereby the mandrel can be used repeatedly to form articles of identical internal size and shape in spite of variations in the pressure level used during the pressurization step.

* * * * *